June 25, 1957   H. S. PAYNE   2,797,352
MEANS AND METHOD FOR IMPROVING THE STARTING OF AN ELECTRIC ARC
Filed July 27, 1954

INVENTOR.
HAROLD SPENCER PAYNE
BY
*Alfred C. Body*
ATTORNEY

United States Patent Office 2,797,352
Patented June 25, 1957

2,797,352

MEANS AND METHOD FOR IMPROVING THE STARTING OF AN ELECTRIC ARC

Harold Spencer Payne, Cleveland Heights, Ohio

Application July 27, 1954, Serial No. 445,997

13 Claims. (Cl. 314—39)

This invention pertains to the art of electric arc welding and, more particularly, to apparatus for use in and a method of starting an electric arc between an electrode and the workpiece to be welded.

The invention is particularly adapted for continuous seam-welding operations of the type wherein an arc is maintained between a workpiece and a continuously advancing electrically energized metallic wire or electrode and will be described with particular reference thereto, although it will be appreciated that the invention has broader applications.

One of the great problems with electric arc welding of general type referred to has been in the establishment of the electric arc; that is, in establishing an ionized path between the electrode end and the workpiece such that the electric arc can be maintained and current will continue to flow even though the end of the electrode is spaced from the workpiece.

In the absence of sufficient electrical voltage imposed on the electrode to jump across the air gap from the electrode end to the workpiece, electric contact must actually be made in order to start the arc. After this contact is initially made, the end of the electrode must then be spaced a slight distance from the work so that an arc can be maintained. This initial contact must be of a type to create certain conditions conducive to the starting of the arc. If the contact is poor; that is, of a very high resistance, insufficient electrical current will flow to start the arc. If the contact is too good; that is, of a very low resistance such as would be obtained by ramming the wire onto the surface of the workpiece, spot welding of the electrode end to the workpiece sometimes results. This spot welding is a matter of great annoyance to the welding operator and, in many cases, severely damages the workpiece, or the welding equipment.

The conditions encountered in arc welding are generally not conducive to the proper contact. Many times the metal being welded has a scale or coating thereon which has a relatively high resistance, making it difficult to establish the proper electrical contact with the workpiece. In the so-called hidden-arc welding processes, oftentimes a granule of flux will become lodged or trapped between the electrode end and the workpiece to prevent the desired electrical contact. In some cases, these problems are aggravated by the condition of the end of the electrode wire itself. For example, in hidden-arc welding, the electrode end is normally below a layer of molten flux. When the arc is extinguished, some of this molten flux clings to the electrode end and forms an insulating glass-like bead thereover sufficient to prevent the end electrically contacting the workpiece when it is desired to restart the arc. Furthermore, when the arc is broken, the end of the electrode is in a molten condition and the end normally hardens into a blunt, hemispherical or rounded contour. Such a blunt end does not pierce the scale or coating on the workpiece or deflect easily off of a grain of flux.

Various ways and means have been proposed in the past for overcoming this problem of proper initial contact of the electrode end with the workpiece, all of which require some special manipulation of the welding head by the operator or some additional material such as arc starting compounds or steel wool placed beneath the electrode end or the like.

High voltage sufficient to jump and ionize the gap between the electrode end and the workpiece prior to contact has been employed, but such apparatus is expensive and many times unreliable.

The present invention contemplates welding apparatus operable primarily at the time the electrode end strikes the workpiece and a method of starting an electric arc which overcomes all of the above objections and others and enables the easy and positive establishment of the arc without any special manipulation by the welding operator.

In accordance with the present invention, means are provided for superimposing on the normal arc-striking movement of the electrode toward the workpiece and at least until the arc is struck, a secondary movement of a generally repetitive nature such as an oscillation, vibration or wiggle, which movement will assist in making the necessary and desired electrical contact with the workpiece for starting the arc. Such secondary movement may be transverse to the length of the electrode wire or parallel thereto, or a combination of both, or circular.

In the case of parallel superimposed movement, the velocity of this secondary movement in each direction should be greater than the normal velocity of the electrode movement toward the workpiece and with a high repetition rate, the result being a series of alternate pull-backs and high-speed advancements of the electrode end toward the workpiece. This velocity of movement may be obtained by properly adjusting the frequency or rate of the repetition together with its amplitude. Thus the mathematical product of the frequency of the repetition rate and the amplitude must always equal at least twice the normal lineal speed of movement of the electrode toward the workpiece and preferably should be several times this lineal speed of movement toward the workpiece.

The theory of success of such a superimposed parallel movement would appear to be either a hammer-like effect of the electrode end on any impediments serving to prevent proper electrical contact with the workpiece or a multiple, high-speed jabbing at the workpiece as the electrode is brought against it, any one of which jabs can start the electric arc. Thus, if a repetiition rate or frequency of 300 per minute is employed, the electrode will make 50 jabs at the workpiece in the first second of proximity therewith, any one of which could, if proper contact is made, start the arc.

In the case of transverse superimposed movement, the normal velocity of movement toward the workpiece is unaffected but, additionally, the electrode end moves generally in the plane of the workpiece at a velocity proportional to the product of the frequency of the repetitive movement and the amplitude.

The result of this movement is to sweep or grind away any flux particles which might otherwise tend to be trapped beneath the electrode end as it approaches the workpiece. This movement also tends to scrape away any scale or other material on the workpiece or to rub away any hardened flux which might have formed on the electrode end. In any event, excellent electrical contact with the workpiece of the type which will establish the arc is almost immediately made.

The amplitude and frequency of this transverse movement should be such as to produce a relatively high transverse velocity of the electrode end relative to the workpiece which may be obtained by a movement of large amplitude and low frequency or low amplitude and high frequency. Thus, the invention contemplates transverse lineal velocities in excess of 200 inches per minute, although less velocities are not excluded in some instances.

The amplitude and frequency of the movement will, to some extent, determine whether or not the superimposed movement is to be continued during the entire welding operation or discontinued immediately after the striking of the arc or a short time thereafter. If the amplitude of movement is relatively large and the frequency low, such movement will interfere with the obtaining of a weld bead of proper dimension. In such event, the invention contemplates stopping the superimposed movement immediately upon the arc becoming established. Such action may be accomplished by means of electrical apparatus sensitive to the establishment of the arc such as current relays in series with the welding electrode or voltage relays connected between the welding electrode or voltage relays connected between the welding electrode and the workpiece. Time-delay means may be provided if the superimposed movement should be continued for some minor fraction of time after striking the arc.

In the event that a relatively low amplitude of movement; e. g., a movement equal to the diameter of the electrode, is employed in conjunction with a higher frequency, it will be appreciated that the superimposed movement may be allowed to continue during the welding operation, particularly on fully automatic welding operations because such a movement of the electrode end will not particularly interfere with the ultimate weld. However, in the event of the use of the invention with hand-held welding heads, the invention contemplates terminating even the low-amplitude superimposed movements immediately upon the arc having been struck. Such a movement is more in the form of a vibration of the electrode head which would be transmitted to the hands of the welding operator and would be extremely disconcerting if not quite uncomfortable over prolonged periods.

This superimposed movement may be effected by either physically moving the welding head or by moving the electrode wire after it has emerged from the head or the wire may be rotated about its axis, the slight curvature which the wire takes as it emerges from the axis being utilized to produce the transverse movement.

In the case of parallel superimposed movement, the electrode nozzle or welding head may be moved in such a manner as to superimpose the desired movement or the electrode feeding mechanism itself may have the movement superimposed thereon as desired.

The means for superimposing the movement on the motion of the electrode toward the workpiece may take a number of different forms. Thus, power-driven extensible and retractable mechanism may be mechanically connected between the welding head or electrode end and some fixed member such as the frame of the welding apparatus or the workpiece itself. In such a case, the movement would have a predetermined, adjustable, discrete movement of any desired amplitude. Alternatively, a mass repetitively moving or oscillating about a point spaced from its center of gravity and mounted on the welding head or otherwise mechanically fastened thereto may be employed. Here, the amount of movement would be determined by the various physical factors involved such as the weight of the mass, the weight of the welding head, the repetition rate, the spacing of the center of gravity from the center of movement and, if the welding head is hand held, the forces exerted by the welding operation. Still further alternatively, the electrode nozzle may be rotated about an axis spaced from the passage through which the electrode moves may be employed or the electrode may be rotating about its axis as it emerges from the electrode nozzle. In some instances, the workpiece may be wiggled or vibrated relative to the electrode to produce the desired movement, although, in such instances, if the workpiece is relatively heavy, relatively large amounts of power are required.

In preferred embodiments of the invention, a mass is rapidly rotated about an axis spaced from its center of gravity at a relatively high speed, the rotating mass being mounted in bearings in turn mounted on the welding head.

The principal object of the invention is the provision of new and improved means and method for positively insuring that an electric arc will be established at the instant of contact of the electrode with the workpiece.

Another object of the invention is the provision of a new and improved means and method for assisting in the starting of an electric arc-welding operation comprising means for and the step of superimposing a repetitive secondary movement on the feeding movement of the electrode end toward the workpiece.

Another object of the invention is the provision of new and improved means and method for insuring the starting of an electric arc comprising apparatus for and the step of wiggling the electrode end at the moment that the electrode touches the workpiece and, then, after the arc is established, stopping such wiggling.

Another object of the invention is the provision of new and improved means and method for insuring the starting of an electric arc comprising apparatus for and the steps of superimposing on the normal electrode feed movement toward a workpiece a reciprocating movement of a limited amount having a frequency and amplitude such that the pullback velocity will exceed the normal feed speed.

Still another object of the invention is the provision of the step of and apparatus for superimposing repetitive transverse movement of relatively high velocity on the electrode end as it is fed toward a workpiece prior to and at the instant of striking the arc.

The invention may take physical form in cetrain steps and combinations of steps and certain parts and combinations of parts, a preferred embodiment of which will be described in detail in this specification and illustrated in the accompanying drawing which is a part hereof, and wherein.

Figure 1:
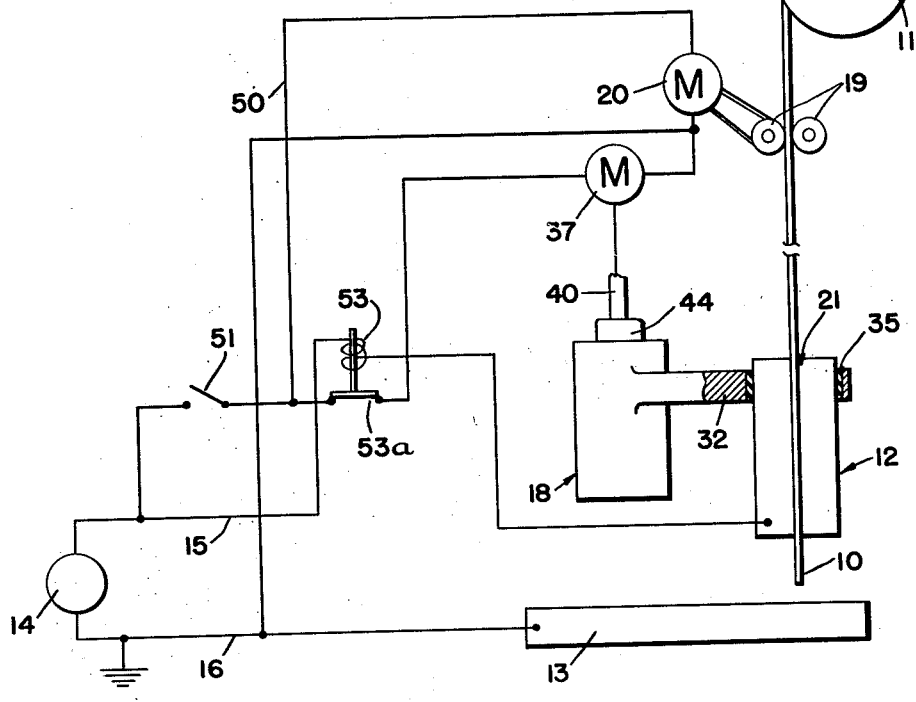
Figure 1 is a somewhat schematic view of welding apparatus and the electrical wiring diagram therefor embodying the present invention.

Referring now to the drawings wherein the showings are for the purposes of illustrating a preferred embodiment of the invention only and not for the purposes of limiting the invention, Figure 1 shows somewhat schematically an electrode wire 10 being advanced through electrical contact means 12 toward a workpiece 13 to be welded. The contact means 12 and workpiece 13 are electrically energized relative to each other from a power source 14 through wires 15, 16 such that when the end of the electrode 10 touches the workpiece 13, an arc will be established therebetween. This arc melts off the end of the wire at a rate equal to the rate of feed of the electrode and deposits weld metal on the workpiece 13.

In accordance with the invention, means 18 are provided for superimposing on this movement of the electrode 10 toward the workpiece 13 a movement such as to facilitate the striking of the arc at the moment of initial contact of the electrode with the workpiece. Electrode feed means in the form of a pair of nip rolls 19 driven by an electric motor 20 are employed for the purpose of advancing the electrode 10 toward the workpiece.

The electrode 10 may be of any desired cross-sectional shape insofar as the invention is concerned and of any desired length. Preferably, the electrode is of an indeterminate length and of a diameter such that it can be readily coiled and will thus be fed to the workpiece from an electrode source 11 in the form of a reel or the like. In a like manner, the electrode 10 may be of any desired material including steel, copper, stainless steel or the like which are normally touched to the workpiece in order to start the arc. The invention is generally not applicable to tungsten electrodes employed for the welding of aluminum wherein generally it is not desired to touch the electrode to the workpiece to start the arc.

The electrical contact means 12 may also take any desired form but are shown in the preferred embodiment of the invention as comprised of an elongated member formed of electrically conductive material such as copper and having a longitudinal passage 21 therethrough of a diameter or size just slightly larger than the diameter or size of the electrode 10. The electrode 10 advancing through this passage 21 makes electrical contact with the sides thereof. Normally, this passage 21 is straight and the electrode 10 because it has been wound on the reel 11 has a slight curvature therein which causes it to bear firmly against the sides of this passage 21, thus making good electrical contact therewith. It will also be appreciated that the contact means could be a pair of contact blocks spring pressed against the sides of the electrode 10 or any other known means for making electrical contact with the electrode. The contact means insofar as the preferred embodiment is concerned are primarily employed for the purpose of transmitting a physical force to the electrode 10 so that a movement generally transverse to the normal feeding movement of the electrode may be superimposed thereon.

The electrode 10 is shown as being advanced from the nip rolls 19 to the contact means 12 in an unsupported manner. It will be appreciated that suitable guiding means such as a flexible conduit could be provided if the nip rolls 19 are located a substantial distance from the contact means 12.

The workpiece 13 can be of any known or desired electrically conductive material such as steel, aluminum, titanium or the like.

It will be noted that no showing has been made of means for excluding the atmosphere from the vicinity of the electric arc once it has been established. Such means, if employed at all, may be of any known or conventional construction including granular flux nozzles, inert gaseous nozzles, either fed coaxial with electrode or spaced therefrom, or a gas-filled housing surrounding the entire welding apparatus and workpiece may be employed. The present invention is useable with any of such types of flux-feeding arrangements and, as they form no part of the present invention, are not shown in the drawings.

Figure 2:
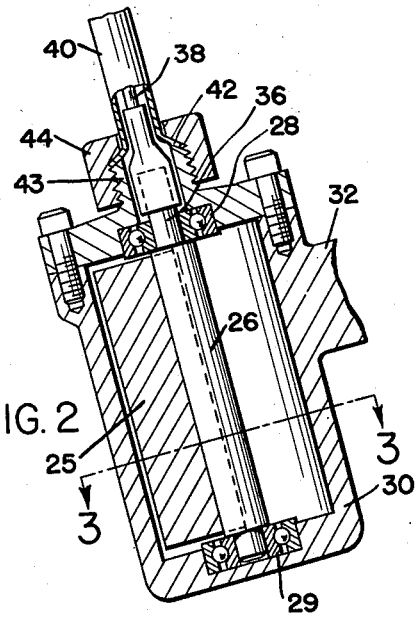
Figure 2 is a side cross-sectional view of a preferred embodiment of means for superimposing a secondary movement on the electrode end.
Figure 3:
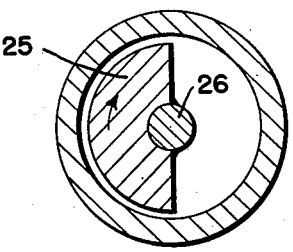
Figure 3 is a cross-sectional view of Figure 2 taken approximately on the line 3—3 thereof.

The means 18 for superimposing a secondary movement on the normal feed-down movement of the electrode 10 are, in the preferred embodiment of the invention, of the type which superimposes a movement transverse to this normal feeding movement of the electrode. In the embodiment shown in Figures 2 and 3, the means 18 comprises a weight 25 mounted for rotation about an axis spaced from its center of gravity and generally parallel to the length of the electrode. This weight is generally semicylindrical in shape and is fixed to a shaft 26 having an axis of rotation coincident with the axis of the cylinder. This shaft 26 extends beyond both ends of the weight 25 and is rotatably supported in bearings 28, 29 mechanically connected to the electrode end. Thus, these bearings 28, 29 are mounted in the ends of a cylindrical housing 30, in turn mounted on the contact means by means of a lateral extension 32 having an opening in which the contact means 12 are fixed. Electrical insulation 35 may be provided for the purpose of electrically insulating the housing 30 from the contact means 12. Obviously, only one bearing need be provided and the housing 30 may, in general, be eliminated if desired. Also, the extension 32 could be bolted or otherwise fixed to the contact means 12 in any suitable manner.

The weight 25 may be rotated by any suitable means but, in the embodiment shown, an electric motor 37 remotely located from the means 18 drives the weight 25 through a flexible shaft 38 connected at the end remote from the motor 37 with an extension 36 on the upper end of the shaft 26. The flexible shaft also includes an outer flexible housing 40 and may be connected to the housing 30 in any desired manner. In the embodiment shown, the end of the housing 40 is flared outwardly as at 42 and is held in engagement with a threaded extension 43 on the upper end of the housing 30 by means of a sleeve nut 44.

The weight 25 being mounted for rotation with the center of gravity spaced from its axis of rotation is unbalanced and a force is created tending to move it in a direction perpendicular to its axis of rotation in an amount proportional to its mass, the square of its speed of rotation and the spacing of its center of gravity from the axis of rotation. This force is transmitted through the bearings to the contact means 12 and, thus, to the electrode end 10. It has been found in practice that the electrode end 10 tends to move in a path approaching a small circle at the same time that it is advancing toward the workpiece.

As the force created by the rotation of the weight 25 is proportional to the square of its rotational speed, it is preferred that the weight 25 be rotated at a relatively high speed. In practice, rotational speeds of between 4000 and 8000 revolutions per minute have been employed. The resultant movement of the electrode end has been in a circle varying between 1/64 and 1/32 of an inch in diameter which is a speed of movement of the electrode end in the plane of the workpiece 13 in excess of 750 inches per minute. This very high speed of movement very quickly scrapes away any scale which might be on the surface of the workpiece or any hardened flux bead which might be on the end of the electrode 10 or serves to either brush away or grind away any flux particles which might normally or otherwise be trapped beneath the end of the electrode.

In accordance with the preferred embodiment of the invention, the superimposed movement is continued only until the starting of the arc. Means are provided for de-energizing the motor 37 at the instant that the arc is struck.

Both the motor 20 and the motor 37 may be energized from any desired power source, and are shown as energized from the source of the welding current 14. One terminal of the motor 20 and one terminal of the motor 37 are connected to ground as is the wire 16. The other terminal of the motor 20 connects to the wire 15 through wire 50 and a switch 51. The other terminal of the motor 37 connects to the wire 50 through the normally closed contact 53a of a current-control relay 53, the energization coil of which is connected in series with the wire 15. Thus, whenever the switch 51 is closed, both the motors 20 and 37 are energized simultaneously. Energization of the motor 20 starts the electrode 10 moving toward the workpiece. Energization of the motor 37 starts the weight 25 rotating and, thus, superimposes a movement on the normal down movement of the electrode 10. When the electrode 10 strikes the workpiece, the arc is almost immediately initiated because of the superimposed transverse movement. Also, at the instant that the arc is struck, current flows through the relay 53, thus opening the normally closed contacts 53a. Opening of these contacts deenergizes the motor 37 and rotation of the weight 25 stops. The relay may have a slight time-delay arrangement if desired. The welding operation may then proceed in the normal manner.

To stop the welding operation, the switch 51 is opened; in which case, the downward feed of the electrode stops and, eventually, the arc length becomes too long to sustain the arc and the arc goes out. Alternatively, the motor 20 may have its direction of rotation reversed whereby the electrode 10 is actually pulled back away from the workpiece 13. When the arc is broken, the normally closed contacts 53a again close, but without effect because the switch 51 is open. The apparatus is then ready to start another welding operation as above described.

The amplitude of movement of the electrode end may be varied at will by varying the mass of the weight 25, varying the spacing of its center of gravity from the center of rotation, by changing its speed of rotation or by varying the distance of the point of application of the forces from the electrode end. In the latter case, as the point is moved backwardly from the electrode end, a leverage effect can be obtained whereby the amplitude can be considerably increased provided, of course, that the contact means 12 are also free to move with the electrode end. Also, the amplitude can be adjusted by adjusting the mass of the welding head itself, it being appreciated that the greater the mass, the lower the amplitude and vice versa.

It will be noted that in the preferred embodiment, the axis of rotation of the weight 25 is generally parallel to the longitudinal axis of the electrode 10. If the axis of rotation were tilted through an angle of 90 degrees, a superimposed movement parallel to the length of the electrode 10 can be obtained, provided, of course, that there is then provided some flexibility between the contact means 12 and the nip rolls 19. By tilting the axis of rotation between the two amounts just indicated, a combination of both parallel and transverse superimposed movement can be obtained.

Using the rotating mass just indicated, the actual amplitude of movement of the electrode end is relatively small and, if desired, the superimposed movement could be continued during the entire welding operation without detriment to the welding operation, although it might considerably bother the welding operator, particularly in the case of hand-held welding heads.

The means 18 shown is only one example of a mass moving in a repetitive manner about an axis spaced from its center of gravity which can be employed for the purpose of superimposing the movement on the electrode end. Obviously, electrically or hydraulically operated oscillating arms could also be employed, although it has been found that for a given desired amplitude of movement, and means shown are the most compact and efficient.

Instead of the motor 37 being remote from the means 18, it could be incorporated directly thereinto.

Also, if desired, the motor 20 or any other motor employed in the welding apparatus could be employed for the purpose of rotating the weight 25, a clutch and suitable speed-gear arrangements being employed for the purpose of controlling the time when the weight 25 will be rotated.

As pointed out heretofore, other means could be employed for the purpose of superimposing the transverse movement on the electrode end. Such means could include, without limitation, a mechanical connection between the contact means 12 and some fixed support of the welding apparatus or the workpiece itself, such means generally including a motor-driven crank or eccentric so as to alternately lengthen and contract the same to provide the desired superimposed movement. The invention contemplates, however, that when such means are employed, they will be rendered inoperative as soon as the arc is struck. With such a type of mechanism, it will be appreciated that the amplitude of the superimposed movement may be readily determined and will always be a predetermined discrete amount and not dependent upon variable factors such as the weight of the welding head or the force by which the welding operator hangs onto the welding head in case a hand-held welding head is employed.

In the event that such a direct mechanical connection is provided for superimposing the movement on the electrode end, the invention contemplates a speed of transverse movement of the electrode end in excess of 200 inches per minute. Normally, such speed will be obtained by using a repetition rate in the movement in excess of 400 times per minute and, preferably, beyond 1000 times per minute.

In some instances, the contact means 12 may be rotated rapidly about an axis spaced from the axis of the opening through which the electrode 10 is advancing. Such an arrangement would cause the electrode end to rotate in a circle with an amplitude proportional to the spacing of the electrode axis from the axis of rotation and at a frequency corresponding to the speed of rotation of the means.

In a like manner, the electrode wire itself can be rotated about its axis as it is advanced through the contact means 12. In such a case, the electrode end, as it emerges from the contact means 12, should assume a slight angle to the axis of rotation in order to obtain an amplitude of movement. This rotation may be either continuously in one direction or in a continually reversing or oscillating manner. If the electrode is of the indeterminate length and is fed to the workpiece from an electrode reel as shown in the preferred embodiment, it will normally have a slight curvature therein which will inherently provide the angle of the electrode end from the axis of rotation as the electrode leaves the contact means.

If the superimposed movement is to be parallel to the length of the electrode; that is, parallel to the normal feeding movement of the electrode, this may either be imposed by rotating the axis of rotation of the means 18 as above described or this superimposed movement may be applied through the nip rolls 19 using suitable mechanical drive mechanism to provide the desired mechanical movement of these nip rolls. In this latter case, the nip rolls may only be employed when they are located close to the contact means 12. Otherwise, the resilience of the wire is sufficient to take up and absorb the superimposed motion so that it does not appear at the electrode end.

It is important from the standpoint of the invention that the superimposed motion on the electrode end be of the repetitive type. By repetitive is meant any movement of either an oscillating type or a rotative type or a combination of both as distinguished from a single lineal or arcuate movement which generally does not periodically repeat itself.

The present invention has been successfully employed on both fully automatic continuous seam welders as well as semiautomatic continuous seam welders wherein the welding head is hand held and practically 100 percent starts being obtained in all cases without any special manipulation by the welding operator or the use of any externally applied starters. The movement of the electrode toward the workpiece is started in the usual manner. Generally, at the same time, the means for superimposing the secondary movements are also started. As the electrode end strikes the workpiece, it is rapidly scraped or rubbed around on the surface in a direction generally parallel to the plane of the workpiece surface to rub away any flux bead on the electrode end, any scale on the surface of the workpiece or any flux particles which might tend to be trapped under the end of the electrode.

In accordance with the patent laws, a preferred embodiment of the invention has been described in this specification and illustrated in the drawings. Obviously, modifications and alterations in this preferred embodiment differing radically in appearance therefrom will occur to others upon a reading and understanding of this specification and it is my intention to include all such alterations and modifications insofar as they come within the scope of the appended claims.

Having thus described my invention, I claim:

1. Arc-welding apparatus comprising, in combination, means for moving an electrode toward a workpiece prior to the striking of an electric arc and means for superimposing on said movement prior to the striking of the arc a repetitive movement whereby electric contact of the electrode end with the workpiece will be facilitated, and means for stopping said repetitive movement when said arc is struck.

2. Arc-welding apparatus comprising, in combination, means for moving an electrode toward a workpiece prior to the striking of an electric arc and means for superimposing on said movement a repetitive movement whereby the electrode end will have a velocity in excess of 200 inches per minute.

3. Arc-welding apparatus comprising, in combination, means for moving an electrode toward a workpiece prior to the striking of an electric arc, means for superimposing on said movement a repetitive movement having a frequency and amplitude to give the electrode end a velocity relative to the workpiece in excess of 200 inches per minute and means for stopping said repetitive movement when the arc is struck.

4. Arc-welding apparatus comprising, in combination, means for moving an electrode toward a workpiece and means for superimposing on said movement prior to striking of the arc a repetitive movement in a direction transverse to the line of movement of the electrode having a frequency in excess of 500 times per minute.

5. Arc-welding apparatus comprising, in combination, means for moving an electrode toward a workpiece and means for superimposing on said movement prior to striking of the arc a repetitive movement in a direction transverse to the line of movement of the electrode having a frequency in excess of 1000 times per minute.

6. Arc-welding apparatus comprising, in combination, means for moving an electrode toward a workpiece and means for superimposing on said movement prior to striking of the arc a repetitive movement in a direction transverse to the line of movement of the electrode having a frequency in excess of 4000 times per minute.

7. Arc-welding apparatus comprising, in combination, means for advancing an electrode toward the workpiece prior to the striking of an electric arc therewith and means for superimposing on said movement a repetitive movement in a direction transverse to the line of movement of said electrode, said repetitive movement having a maximum instantaneous velocity in excess of 200 inches per minute.

8. Electric arc-welding apparatus comprising, in combination, means for advancing an electrode toward a workpiece prior to the striking of an electric arc therewith and means for superimposing on said movement a repetitive movement in a direction transverse to the line of movement of the electrode, said repetitive movement having a frequency in excess of 1000 times per minute and an amplitude not greater than the diameter of the electrode wire.

9. Electric arc-welding apparatus comprising, in combination, means for advancing an electrode end toward the workpiece prior to the striking of an electric arc therewith and means for superimposing on said movement a repetitive movement to assist in the striking of the arc, said means comprising a mass moving about an axis spaced from its center of gravity and providing vibrations of limited amplitude but high frequency, and means mechanically connecting said vibrations to said electrode end.

10. The combination of claim 9 wherein said mass is a rotating mass having an axis parallel to the line of movement of the electrode.

11. The combination of claim 9 wherein said mass comprises a mass rotating about an axis at an angle to the path of movement of the electrode.

12. Electric arc-welding apparatus comprising, in combination, means for advancing an electrode toward a workpiece prior to the striking of the arc and means for scraping away any impediments which might interfere with proper electrical contact of the electrode with the work, comprising means for superimposing on said movement toward the workpiece prior to the striking of the arc a repetitive movement in a direction transverse to the line of movement of the electrode and means for stopping said repetitive movement when the arc is struck.

13. The method of starting an arc-welding operation comprising advancing an electrically energized electrode toward a workpiece and simultaneously moving the end of said electrode in a repetitive manner in a direction transverse to the movement of the electrode toward the workpiece, continuing such movement until the arc is struck and then stopping same.

References Cited in the file of this patent

UNITED STATES PATENTS

| | | |
|---|---|---|
| 1,933,340 | Raymond | Oct. 31, 1933 |
| 2,024,965 | Chapman | Dec. 17, 1935 |